(12) United States Patent
Feng

(10) Patent No.: US 11,630,429 B2
(45) Date of Patent: Apr. 18, 2023

(54) POWER GRID RESOURCE ALLOCATION

(71) Applicant: Hitachi Energy Switzerland AG, Baden (CH)

(72) Inventor: Xiaoming Feng, Cary, NC (US)

(73) Assignee: HITACHI ENERGY SWITZERLAND AG, Baden (CH)

(*) Notice: Subject to any disclaimer, the term of this patent is extended or adjusted under 35 U.S.C. 154(b) by 149 days.

(21) Appl. No.: 17/129,426

(22) Filed: Dec. 21, 2020

(65) Prior Publication Data
US 2022/0197232 A1 Jun. 23, 2022

(51) Int. Cl.
*G05B 19/042* (2006.01)
*G06F 17/10* (2006.01)

(52) U.S. Cl.
CPC .... *G05B 19/042* (2013.01); *G05B 2219/2639* (2013.01); *G06F 17/10* (2013.01)

(58) Field of Classification Search
CPC .......... G05B 19/042; G05B 2219/2639; G06F 17/10
See application file for complete search history.

(56) References Cited

U.S. PATENT DOCUMENTS

| | | | |
|---|---|---|---|
| 8,412,551 B2* | 4/2013 | Feng ................ | G06Q 10/06314 706/12 |
| 2015/0039145 A1* | 2/2015 | Yang ........................ | H02J 3/00 700/291 |
| 2019/0286993 A1 | 9/2019 | Pan et al. | |

OTHER PUBLICATIONS

Guan et al. "The Conditions for Obtaining Feasible Solutions to Security-Constrained Unit Commitment Problems;" IEEE Transactions on Power Systems, vol. 20, No. 4, Nov. 2005. (Year: 2005).*
Kim et al. "An Asynchronous Decomposition Algorithm for Security Constrained Unit Commitment under Contingency Events;" Power Systems Computation Conference (PSCC), 2018. (Year: 2018).*

(Continued)

*Primary Examiner* — Chad G Erdman
(74) *Attorney, Agent, or Firm* — Slater Matsil, LLP

(57) ABSTRACT

A method of operating a power grid includes: generating, by a power management system of the power grid, an intermediate resource allocation schedule that provides a tentative schedule of resource allocation for power grid resources operating within the power grid; determining, by the power management system, whether the intermediate resource allocation schedule is feasible by checking whether the intermediate resource allocation schedule satisfies coupling constraints of a power grid resource allocation profile of the power grid indicative of an operation of the power grid constrained by power grid operational information; and in response to determining that the intermediate resource allocation schedule is infeasible, repairing, by the power management system, the intermediate resource allocation schedule to generate a feasible resource allocation schedule, where the repairing comprises determining whether a first dispatch solution obtained by solving a dispatch problem with fixed integer decisions from the intermediate resource allocation schedule is feasible.

18 Claims, 7 Drawing Sheets

(56) References Cited

OTHER PUBLICATIONS

Shaw, John J., "A Direct Method for Security-Constrained Unit Commitment", IEEE Transactions on Power Systems, vol. 10, No. 3, Aug. 1995, pp. 1329-1342, XP000558022, Alphatech, Inc., Burlington, MA 14 pages total.

Wei et al., "Robust Energy and Reserve Dispatch Under Variable Renewable Generation", IEEE Transactions on Smart Grid, IEEE, USA, vol. 6, No. 1, Jan. 2015, pp. 369-380, XP011568462, 12 pages total.

* cited by examiner

POWER GRID RESOURCE ALLOCATION

TECHNICAL FIELD

The present disclosure relates generally to power grids and operation of power grids, and, in particular embodiments, to power grid resource allocation.

BACKGROUND

Independent system operators (ISOs) use unit commitment (UC) to obtain generation resource and demand commitment and dispatch in a power grid. Unit commitment determines the commitment states and generation levels of all generators, energy storage systems, and price dependent loads over the scheduling horizon to minimize the total generation cost while meeting all system and regional constraints, such as load balance and spinning reserve requirements, transmission network constraints, and individual unit operating constraints. Unit commitment is often formulated as a mixed integer linear programming (MILP) problem.

Since a typical power grid is being driven to operate more and more close to its security margin, security-related transmission constraints are included to constrain the unit commitment. Therefore, typical power system resources scheduling involves security constrained unit commitment (SCUC), where the security constraints may be, e.g., transmission line thermal capacity constraints for the base case operating condition and contingent operating conditions. SCUC is used in day ahead, intra-day, and real time power grid scheduling. In solving for security constrained unit commitment, the minimum-cost operation schedule for generators (may also be referred to as power plants) is determined over a scheduling horizon. For example, a minimum-cost operation schedule is identified that satisfies the operation constraints of each generator unit, the electric network constraints in the base case network topology, and various operator specified contingency scenarios.

SUMMARY

In some embodiments, a method of operating a power grid includes: generating, by a power management system of the power grid, an intermediate resource allocation schedule, wherein the intermediate resource allocation schedule provides a tentative schedule of resource allocation for power grid resources operating within the power grid; determining, by the power management system, whether the intermediate resource allocation schedule is feasible by checking whether the intermediate resource allocation schedule satisfies coupling constraints of a power grid resource allocation profile of the power grid, wherein the power grid resource allocation profile is indicative of an operation of the power grid constrained by operational information of the power grid; and in response to determining that the intermediate resource allocation schedule is infeasible, repairing, by the power management system, the intermediate resource allocation schedule to generate a resource allocation schedule that is feasible, the resource allocation schedule providing a final schedule of resource allocation for the power grid resources operating within the power grid, wherein repairing the intermediate resource allocation schedule comprises determining whether a first dispatch solution obtained by solving a dispatch problem with fixed integer decisions from the intermediate resource allocation schedule is feasible.

In some embodiments, a power management system of a power grid includes: one or more processors; and a memory storing a program to be executed in the processor, the program comprising instructions, when executed in the one or more processors, cause the one or more processors to: generate an intermediate resource allocation schedule, wherein the intermediate resource allocation schedule provides a tentative schedule of resource allocation for power grid resources operating within a power grid; determine whether the intermediate resource allocation schedule is feasible by checking whether the intermediate resource allocation schedule satisfies coupling constraints of a power grid resource allocation profile of the power grid, wherein the power grid resource allocation profile is indicative of an operation of the power grid constrained by operational information of the power grid; and in response to determining that the intermediate resource allocation schedule is infeasible, repair the intermediate resource allocation schedule to generate a resource allocation schedule that is feasible, wherein the resource allocation schedule provides a final schedule of resource allocation for the power grid resources operating within the power grid, wherein repairing the intermediate resource allocation schedule comprises determining whether a first dispatch solution obtained by solving a dispatch problem with fixed integer decisions from the intermediate resource allocation schedule is feasible.

In some embodiments, a system of a power grid includes: a power management system configured to: generate an intermediate resource allocation schedule, wherein the intermediate resource allocation schedule provides a tentative schedule of resource allocation for power grid resources operating within a power grid; determine whether the intermediate resource allocation schedule is feasible by checking whether the intermediate resource allocation schedule satisfies coupling constraints of a power grid resource allocation profile of the power grid, wherein the power grid resource allocation profile is indicative of an operation of the power grid constrained by operational information of the power grid; and in response to determining that the intermediate resource allocation schedule is infeasible, generate a resource allocation schedule that is feasible by repairing the intermediate resource allocation schedule, wherein the resource allocation schedule provides a final schedule of resource allocation for the power grid resources operating within the power grid, wherein repairing the intermediate resource allocation schedule comprises determining whether a first dispatch solution obtained by solving a dispatch problem with fixed integer decisions from the intermediate resource allocation schedule is feasible; power grid resources configured to be controlled in accordance with the resource allocation schedule; and a transmitter configured to transmit the resource allocation schedule from the power management system to the power grid resources.

BRIEF DESCRIPTION OF THE DRAWINGS

The details of one or more embodiments of the disclosure are set forth in the accompanying drawings and the description below. Other features, objects, and advantages of the disclosure will be apparent from the description and drawings, and from the claims. In the figures, identical reference symbols generally designate the same component parts throughout the various views, which will generally not be re-described in the interest of brevity. For a more complete understanding of the disclosure, reference is now made to the following descriptions taken in conjunction with the accompanying drawings, in which:

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

Solving large scale security constrained unit commitment (SCUC) can take tremendous time and computational resources due to its huge dimensions and complexity. Embodiments of the present disclosure describe an SCUC solver that efficiently solves large scale SCUC. An example SCUC solver first finds a tentative power resource allocation schedule by solving a Lagrangian-relaxed (LR) dual of the power grid resource allocation profile. The SCUC solver then checks if the tentative resource allocation schedule is feasible. If the tentative resource allocation schedule is infeasible, the SCUC solver repairs the infeasibilities of the tentative resource allocation schedule to achieve a resource allocation schedule that is feasible.

Figure 1:
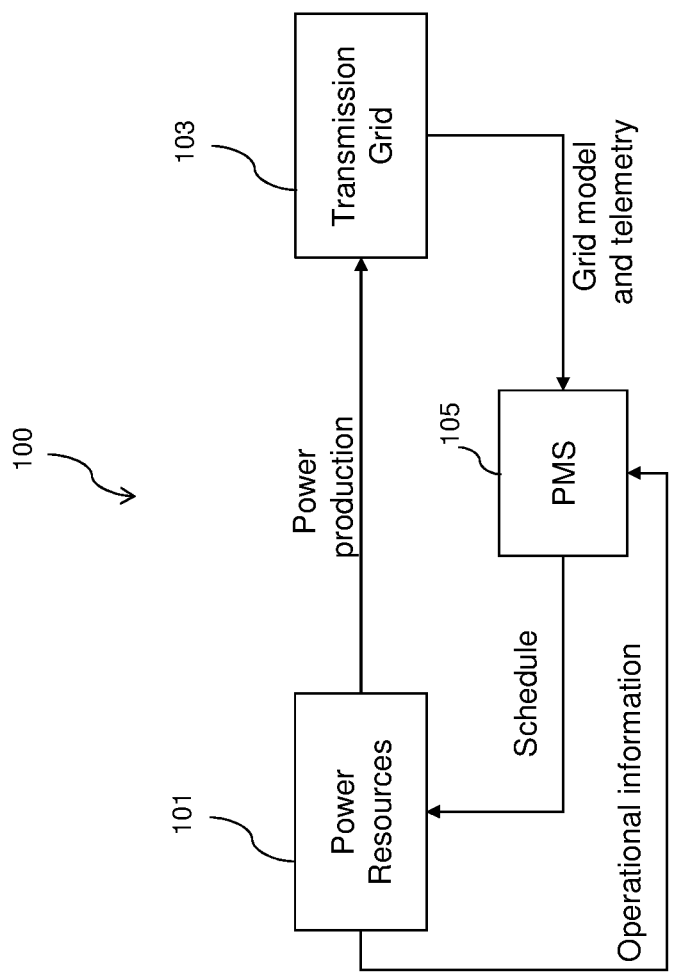
FIG. 1 illustrates a block diagram of a power grid having a power management system (PMS) in a control loop of the power grid, in some embodiments.

FIG. 1 illustrates a block diagram of a power grid 100, in some embodiments. The power grid 100 (may also be referred to as a power system) includes a plurality of power resources 101 (e.g., power generators, or energy storage systems). The power resources 101 may be of different types, such as thermal power plants (e.g., coal, natural gas, nuclear power plants), hydro power plants, renewable resource power plants (e.g., wind farms, solar plants), energy storage systems, and demand response programs. Depending on the power plant type, each of the power resources 101 may be subject to complex technical and business constraints, such as minimum up/down time, ramp up/down rate, modulation/stability (e.g., a unit may not change its production level too many times), and start-up/shut-down ramp rate (e.g., when starting/stopping, a unit follows a specific power curve which may depend on how long the plant has been offline/online).

The power grid 100 also includes a transmission grid 103, which is the electrical grid that delivers electricity generated by the power resources 101 (e.g., power plants) to consumers. The transmission grid 103 is an interconnected network that may span a wide geographical region (e.g., a country). The complex characteristics of the transmission grid 103, such as network topology, device equipment parameters, and line flow limits, as well as resource response rates may need to be considered in solving the security constrained unit commitment system.

As illustrated in FIG. 1, the power grid 100 further includes a power management system (PMS) 105, which may be a market management system (MMS) or an emergency management system (EMS). The PMS 105 may include various functional blocks for implementing various functions, such as functional blocks 200 and 300 of FIG. 3. For example, the PMS 105 may include a Clearing Engine that runs market scheduling applications to clear market, to determine market clearing prices for energy and ancillary services (such as various reserves and responses), and to schedule commitment and dispatches for reliability.

In some embodiments, the Clearing Engine solves the security constrained unit commitment system to provide a resource allocation schedule for the power grid 100. The resource allocation schedule may include commitment decisions (e.g., whether a power plant is online and able to produce energy at any time instant), production (also called dispatch) decisions (e.g., how much energy a power plant is producing at any time instant), and controllable network element decisions (e.g., power flows on HVDC transmission lines and AC transmission lines with phase angle regulators). The resource allocation schedule may also be referred to as an operation schedule of the power grid 100. After being generated, the resource allocation schedule is sent to the power resources 101 by, e.g., a transmitter (which may be a part of the power management system 105), such that the power resources 101 are operated in accordance with the resource allocation schedule, in some embodiments.

In some embodiments, the resource allocation schedule are generated by solving the security constrained unit commitment system while taking into consideration of the operational information (e.g., various constraints) of the power grid 100, such as the constraints of the power resources 101 (e.g., generation capacity and operating margin including safe operating ranges), constraints of the transmission grid 103, market information (e.g., bidding information, cost information, predicted demand information, regulatory requirements such as emission target). The goal of the resource allocation schedule is to clear market offer and bid while maximizing total welfare or minimize total cost. In one example embodiment, the goal may be to satisfy energy demand that minimizes energy production costs while being subject to the constraints of reliability and emissions. In another example embodiment, the goal may be to maximize energy production profits, e.g., the difference between revenues (from sales of electricity) and costs (from production of electricity).

Figure 2:
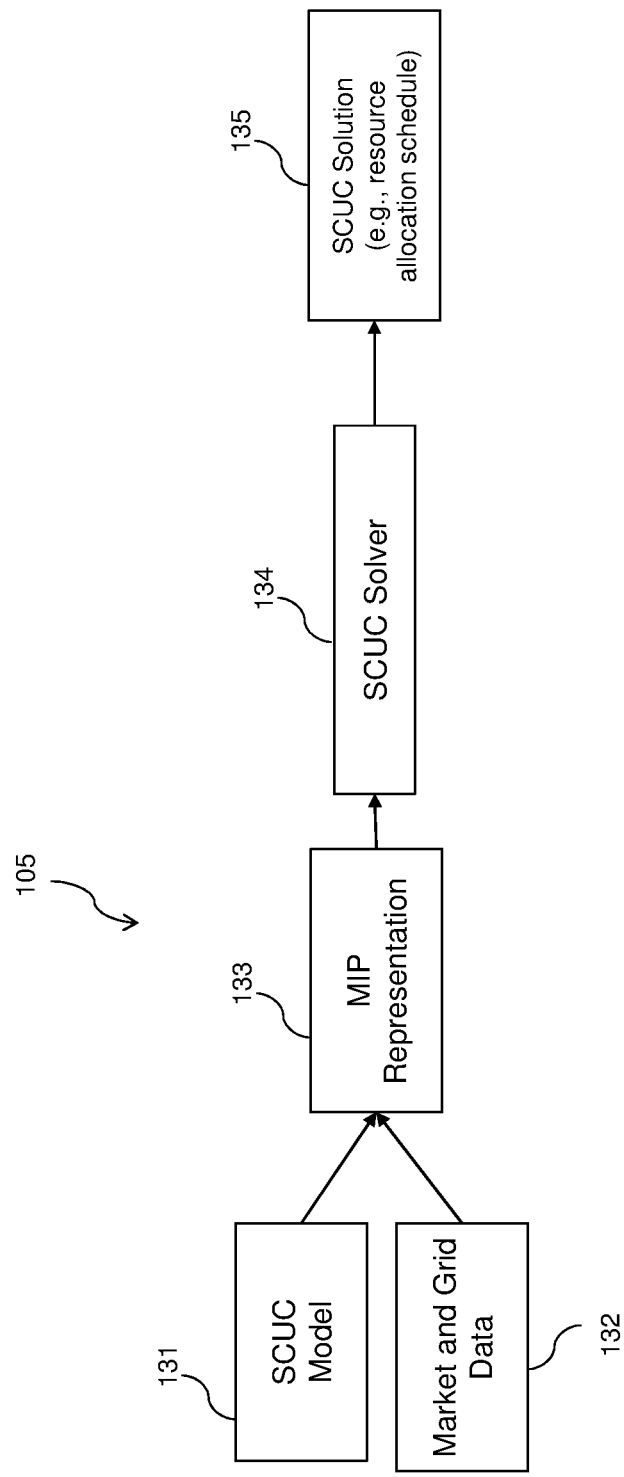
FIG. 2 is a function block diagram of a power management system (PMS), in some embodiments.

FIG. 2 is a function block diagram of a power management system (PMS) 105, in an embodiment. The PMS 105 in FIG. 2 may be used in the power management system 105 of FIG. 1, as an example. For simplicity, not all functional blocks of the PMS 105 are illustrated in FIG. 2.

As illustrated in FIG. 2, the PMS 105 formulates the SCUC problem as a mixed integer programming (MIP) representation 133 by using an SCUC model 131 and applying market and grid data 132 to the SCUC model 131. Therefore, the MIP representation 133 is a mathematical model (e.g., 131) with constraints, in some embodiments. Details of the SCUC model and formulating the MIP representation 133 are described below. In the discussion herein, the term mixed integer programming (MIP) may be used interchangeably with mixed integer linear programming (MILP).

The PMS 105 further includes an SCUC solver 134, which is configured to generate an SCUC solution 135 (e.g., a resource allocation schedule). In some embodiments, the SCUC solver 134 is configured to implement the functional blocks 200 and 300 of FIG. 3 and is described below in further detail.

In an embodiment, the SCUC model 131 for the security constrained unit commitment (SCUC) system is formulated as the following optimization problem:

$$\min_x \sum_{j=1}^{N} c_j^T x_j \quad (1.1)$$

subject to the following constraints:

$$A_j x_j \geq b_j, \ j=1, 2, \ldots, N, \quad (1.2) \text{ and}$$

$$\sum_{j=1}^{N} A_{c,j} x_j \geq b_c \quad (1.3)$$

where N is the number of power grid resources (e.g., number of power plants and loads in the power grid), j is the resource index, $x_j$ is the decision vector for resource j, $c_j$ is the cost coefficient vector for resource j, $A_j$ is the constraint matrix for resource j, $A_{c,j}$ is the coupling constraint matrix for resource j, $b_j$ is the constraint bound vector for resource j, and $b_c$ is the constraint bound vector of coupling constraints. The constraints in Equation (1.2) may be referred to as the constraints of each of the power grid resources, and the constraints in Equation (1.3) may be referred to as the coupling constraints of the SCUC system. In the discussion herein, the SCUC system (also referred to as an SCUC problem) of Equations (1.1)-(1.3) may also be referred to as a power grid resource allocation function, or a power grid resource allocation profile. Note that in Equation (1.1), a vector x is used to denote all of the decision vectors $x_j$, j=1, 2, . . . , N. Throughout the discussion herein, unless otherwise specified, the same mathematical symbol (e.g., $x_j$, $c_j$, $A_j$, $A_{c,j}$) in different equations refer to the same or similar entities.

Therefore, solving the security constrained unit commitment system is equivalent to finding the decision vectors $x_j$, j=1, 2, . . . , N, that minimize the loss function (or cost function) shown in Equation (1.1) while satisfying the various constraints in Equations (1.2) and (1.3), where the decision vector $x_j$ includes information for the resource allocation schedule for the j-th power grid resource. For example, each decision vector $x_j$ includes binary information for the j-th power resource (e.g., commitment decisions to turn on or off the j-th power resource at particular scheduled time slots). In addition, each decision vector $x_j$ includes non-binary (e.g., continuous value) information for the j-th power resource, such as production information (e.g., amount of energy to produce). The decision vectors $x_j$, j=1, 2, . . . , N, are used to form a power resource allocation schedule, which provides a schedule of resource allocation (e.g., whether a power station is turned on or off at particular time slots, and how much power to generate, etc.) for the power grid resources operating within the power grid.

The various constraints of the power grid 100 (e.g., market and grid data 132) discussed above may be included in the constraint matrix $A_j$ and/or the coupling constraint matrix $A_{c,j}$, in some embodiments. The cost coefficient vector $c_j$ may include information such as cost information of the energy production. In various embodiments, the security constrained unit commitment system is a large-scale, mixed integer, linear, non-convex optimization problem. The security constrained unit commitment system is NP hard (Non-deterministic Polynomial-time hardness) and scales poorly with parallel MIP solvers using conventional methods.

As illustrated in the example of FIG. 2, the security constrained unit commitment (SCUC) system may be represented as a mixed integer programming (MIP) representation 133. Traditionally, MIP solvers are used to solve SCUC problems. An MIP solver may be a software package running on a processor (e.g., a computer) for solving an MIP problem (e.g., the security constrained unit commitment system). A commercially available general purpose MIP solver, such as CPLEX, or Gurobi, may be used to solve the security constrained unit commitment system. Open source MIP solvers such as CBC may also be used as the MIP solver.

Typically, an MIP solver, through a series of branch-and-bound (B&B) operations and/or a series of branch-and-cut (B&C) operations, searches through the vector space of the decision vectors to find integer feasible solutions with smaller and smaller loss function for the SCUC system, thereby gradually approach the optimum solution (e.g., a set of decision vectors $x_i$ that correspond to a minimum loss function for the SCUC system). The MIP solver computes and updates, in multiple iterations/steps, the values for the decision vectors such that the loss function decreases as time goes by, until the MIP solver reaches a final solution, which is the optimum solution of the SCUC system or is close enough to the optimum solution. The path (e.g., vector space traversed by the MIP solver) from an initial (e.g., temporary) solution to the final solution is said to be a convergence path of the MIP solver (or of the SCUC system), and the MIP solver is said to converge to the final solution along this convergence path.

Due to, e.g., the larger number (e.g., hundreds, thousands, or millions) of variables in the decision vectors and the factor that the decision vectors include both integer-valued variables and real-valued variables (e.g., having continuous values), it may take a long time and intensive computational resource for an MIP solver to find a feasible solution to the SCUC system. The presently disclosure describes an SCUC solver that uses a two-step processing to efficiently find a feasible solution with good optimality (typically with dual-ity gap <0.5%) for the SCUC system.

Figure 3:
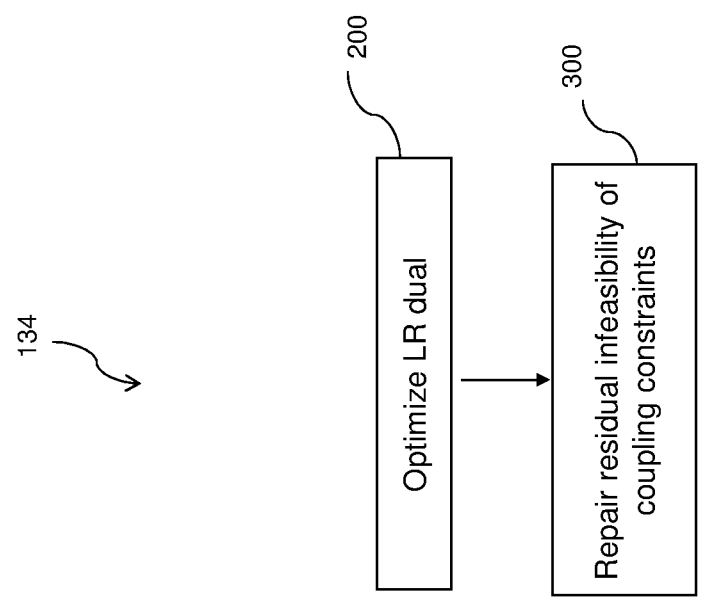
FIG. 3 is a functional block diagram of a security constrained unit commitment (SCUC) solver, in some embodiments.

FIG. 3 illustrates a functional block diagram of a security constrained unit commitment (SCUC) solver 134, in some embodiments. The SCUC solver 134 may be used in the SCUC solver 134 of FIG. 2. The SCUC solver 134 includes two functional blocks 200 and 300 for the two-step processing to find a feasible solution to the SCUC system.

As illustrated in FIG. 3, in the functional block 200, the SCUC solver 134 optimizes a Lagrangian-relaxed (LR) dual (also referred to as an LR dual problem) of the SCUC problem of Equations (1.1)-(1.3) to generate an intermediate (e.g., a tentative) resource allocation schedule. The intermediate resource allocation schedule, however, may not satisfy all the coupling constraints of the SCUC system. The SCUC solver 134 then checks if the tentative resource allocation schedule is feasible (e.g., satisfies all constraints of the SCUC system). If the tentative resource allocation schedule is infeasible, the SCUC solver 134 repairs the infeasibilities of the tentative resource allocation schedule to achieve a resource allocation schedule that is feasible in the functional block 300. Details of the functional blocks 200 and 300 are discussed below.

Figure 4:
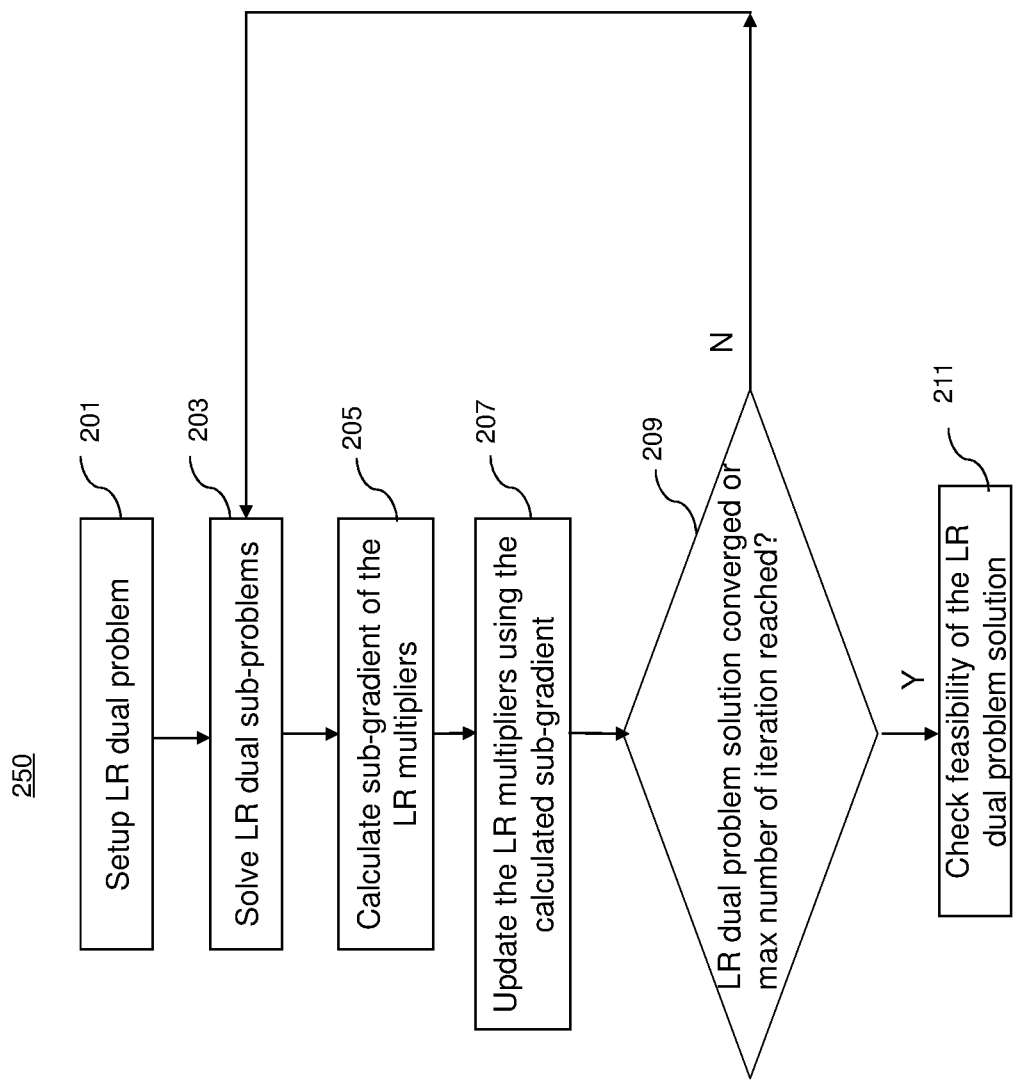
FIG. 4 illustrates a flow chart of a method for solving a Lagrangian-relaxed (LR) dual of a security constrained unit commitment (SCUC) system, in an embodiment.

FIG. 4 illustrates a flow chart of a method 250 for optimizing a Lagrangian-relaxed (LR) dual of a security constrained unit commitment (SCUC) system, in an embodiment. The processing illustrated in FIG. 4 is used to implement the functional block 200 of FIG. 3, in the illustrated embodiment.

In block 201 of FIG. 4, the LR dual of the SCUC system is set up. In an example embodiment, optimizing the LR dual of the SCUC problem is formulated as the following optimization problem:

$$\max_{\lambda} \phi(\lambda) \tag{2.1}$$

subject to:

$$\lambda \geq 0 \tag{2.2}$$

where $\lambda$ is a Lagrangian multiplier vector (e.g., a vector comprising a plurality of Lagrangian multipliers), and $\phi(\lambda)$ is the LR dual of the SCUC defined as:

$$\phi(\lambda) = \min_{x} \sum_{j=1}^{N} c_j^T x_j + \lambda^T \left( b_c - \sum_{j=1}^{N} A_{c,j} x_j \right) \tag{2.3}$$

$$= \lambda^T b_c + \sum_{j=1}^{N} \min_{x_j} (c_j^T - \lambda^T A_{c,j}) x_j \tag{2.4}$$

subject to the following constraints:

$$A_j x_j \geq b_j, j=1, 2, \ldots, N. \tag{2.5}$$

Note that by rewriting (2.3) into (2.4), the LR dual problem of Equations (2.3) and (2.5) is decomposed into a plurality of LR dual sub-problems:

$$\min_{x_j} (c_j^T - \lambda^T A_{c,j}) x_j, j = 1, 2, \ldots, N. \tag{2.6}$$

subject to the constraints of Equation (2.5) (e.g., $A_j x_j \geq b_j$, j=1, 2, ..., N.). Each of the LR dual sub-problems in (2.6) contains only the j-th decision vector $x_j$ and the j-th coupling constraint matrix $A_{c,j}$. Therefore, the number of variables in each of the LR dual sub-problems is much smaller than the number of variables in the original SCUC problem, and thus, can be solved much faster. In addition, each of the LR dual sub-problem s may be solved by a different solver (e.g., an MIP solver), thus all of the LR dual sub-problems may be solved in parallel by a plurality of solvers (e.g., N MIP solvers) to reduce the amount of time needed to solve the LR dual sub-problems. In other words, solving the LR dual problem can be achieved by solving the plurality of LR dual sub-problems in parallel. In the discussion herein, the solvers for solving the LR dual sub-problems may also be referred to as LR dual sub-problem solvers. As described in more detail hereinafter, optimizing the LR dual of the SCUC problem is achieved by solving the LR dual problem and updating the Lagrangian multiplier vector $\lambda$ alternately in multiple iterations.

Next, in block 203, the LR dual of the SCUC system is solved, e.g., by solving the plurality of LR dual sub-problems in Equation (2.6) using a plurality of LR dual sub-problem solvers (e.g., a plurality of MIP solvers). Note that when solving the LR dual sub-problems of Equation (2.6), the variables to solve (e.g., to optimize) are the decision vectors $x_j$, and the Lagrangian multiplier vector $\lambda$ has a fixed value (e.g., treated as a constant vector). In the first iteration, the Lagrangian multiplier vector $\lambda$ is assigned a suitable initial value (e.g., a zero vector). The Lagrangian multiplier vector $\lambda$ is updated subsequently (see blocks 205 and 207) in each iteration. Therefore, in a subsequent iteration, for the processing of block 203, the Lagrangian multiplier vector $\lambda$ uses the updated value of the Lagrangian multiplier vector $\lambda$ obtained from the previous iteration.

Next, in block 205, a sub-gradient of the Lagrangian multiplier vector $\lambda$ is calculated using the following equation:

$$sg = b_c - \sum_{j=1}^{N} A_{c,j} x_j \tag{2.7}$$

where the decision vectors $x_j$ in Equation (2.7) are the decision vectors $x_j$ obtained from solving the LR dual problem in block 203.

Next, in block 207, the Lagrangian multiplier vector $\lambda$ is updated using the calculated sub-gradient sg from block 205. One skilled in the art will readily appreciate that different methods for updating the Lagrangian multiplier vector $\lambda$ are available, and any suitable updating method may be used to update the Lagrangian multiplier vector $\lambda$. As a non-limiting example, the Lagrangian multiplier vector $\lambda$ may be updated by the following:

$$\lambda^{(k+1)} = \lambda^{(k)} + \Delta \times sg \tag{2.8}$$

where $\Delta$ is a step size used in updating the Lagrangian multiplier vector $\lambda$, and k is the iteration index.

Next, in block 209, convergence of the optimization of the LR dual problem is checked, e.g., by checking the difference between the values of $\phi(\lambda)$ achieved in the current iteration and the last iteration. For example, if the difference between $\phi(\lambda)$ in the current iteration and in the last iteration is smaller than a pre-determined threshold, it is determined that the convergence of the optimization of the LR dual problem is achieved, and the processing proceeds to block 211. Another criteria for stopping the iterative processing may be that a pre-determined maximum number of iterations has been reached. If convergence of the optimization of the LR dual problem is not achieved and the max number of iterations has not been reached, the processing goes back to block 203 for the next iteration.

In block 211, an intermediate resource allocation schedule is formed based on the decisions vectors $x_j$ of the solution to the LR dual problem (or LR dual problem solution for short). The intermediate resource allocation schedule provides a tentative resource allocation schedule, because the LR dual problem solution may not be a feasible solution with respect to the relaxed constraints. Next, the feasibility of the LR dual problem solution is checked. If the decision vectors $x_j$ of the LR dual problem solution satisfy all the constraints in Equations (1.2) and (1.3), the LR dual problem solution is said to be feasible, and the intermediate resource allocation schedule is output by the SCUC solver 134 as the resource allocation schedule, and the processing in functional block $_{30}o$ is skipped.

On the other hand, if the decision vectors $x_j$ do not satisfy all constraints in Equations (1.2) and (1.3), the LR dual problem solution is said to be infeasible or have residual infeasibility. Note that in the illustrated embodiment, solutions to the LR dual sub-problems (2.6) must satisfy the constraints of Equation (2.5), which is the same as the constraints in Equation (1.2), thus only the coupling constraints in Equation (1.3) need to be checked to determine the feasibility of the LR dual problem solution. When any of the coupling constraints in Equation (1.2) is not satisfied, the LR dual problem solution is said to have residual infeasibility in the coupling constraints.

When the LR dual problem solution is determined to be infeasible, the intermediate resource allocation schedule is repaired by the functional block 300 (see FIG. 3) to obtain a feasible resource allocation schedule. Therefore, the processing of the functional block 300 may also be referred to as repairing the (residual) infeasibility of the intermediate resource allocation schedule, repairing the (residual) infeasibility of the LR dual problem solution, or repairing the (residual) infeasibility of the coupling constraints.

Figure 5:
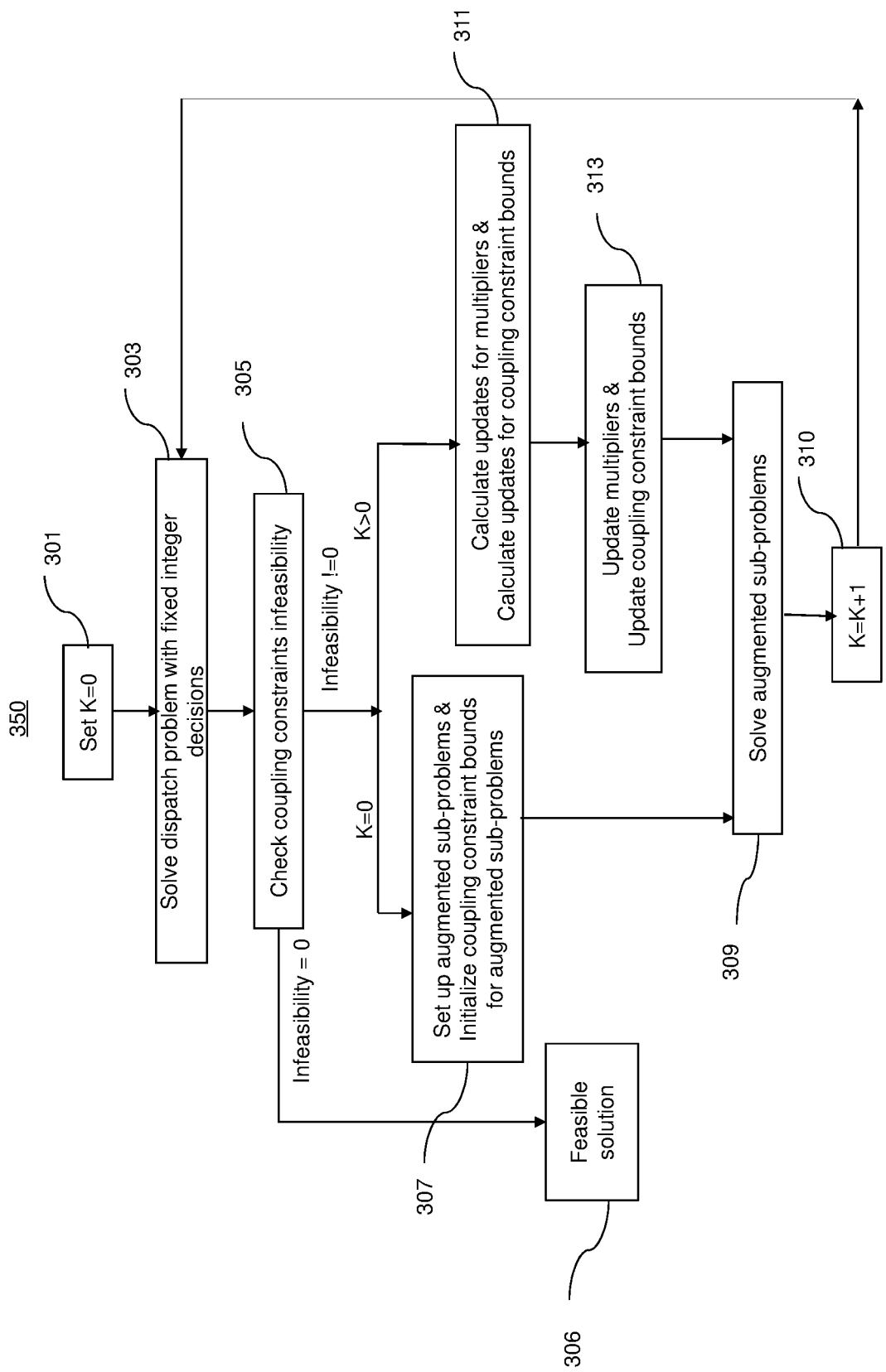
FIG. 5 illustrates a flow chart of a method for repairing infeasibilities of a power resource allocation profile, in an embodiment.

FIG. 5 illustrates a flow chart of a method 350 for repairing infeasibilities of a power resource allocation profile, in an embodiment. The processing illustrated in FIG. 5 is used to implement the functional block 300 of FIG. 3, in the illustrated embodiment.

The processing illustrated in FIG. 5 is iterative, and therefore, an index k is used to indicate the iteration number of the iterative processing. In block 301, the index k is assigned an initial value of zero. Next, in block 303, a dispatch problem (also referred to as an economic dispatch problem) is solved. For the first iteration (e.g., when k=0), the dispatch problem is solved with fixed integer decisions from the LR dual problem solution (obtained in the functional block 200 of FIG. 3). For subsequent iterations (e.g., when k>0), the dispatch problem is solved with fixed integer decisions from an augment sub-problems solution (obtained in block 309 of last iteration). For ease of discussion, the dispatch problem may be referred to as being solved with fixed integer decisions without identifying the origin of the fixed integer decisions (e.g., from the LR dual problem solution or from the augmented sub-problems solution). The dispatch problem is formulated as:

$$\min_{x}\left(M^T S + \sum_{j=1}^{N} c_j^T x_j\right) \quad (3.1)$$

subject to $$A_j x_j \geq b_j, j = 1, 2, \ldots, N \quad (3.2)$$

and $$\sum_{j=1}^{N} A_{c,j} x_j + S \geq b_c \quad (3.3)$$

The dispatch problem in (3.1)-(3.3) is similar to the original SCUC problem in (1.1)-(1.3), but with a slack variable vector S (which includes a plurality of slack variables that are real-valued) added. In other words, the dispatch problem is obtained by modifying the SCUC problem with slack variables. The dispatch problem also includes a penalty vector M for the slack variable vector S. Note that the dispatch problem is solved with fixed integer decisions, which means that when solving the optimization problem of (3.1)-(3.3), the integer variables (e.g., decisions to turn on or off the power grid resources, and other variables having integer values, if any) in the decision vectors $x_j$ are fixed at values provided by the LR dual problem solution (when k=0) or by the augmented sub-problem solution (when k>0). In other words, the optimization of the dispatch problem is only performed for the non-integer variables in the decision vectors $x_j$, and the integer variables in the decision vectors $x_j$ are treated as constants. Since the number of variables to solve in the dispatch problem is less than that in the original SCUC system, and since the variables to optimize are all real-valued (thus may have continuously gradient), the dispatch problem is easier to solve. An MIP solver may be used to solve the dispatch problem, although in this case, the MIP solver only needs to solve the non-integer variables, which results in shorter time needed to solve the dispatch problem. Alternatively, a solver simpler than an MIP solver, e.g., a solver that only optimizes non-integer variables, may be used to solve the dispatch problem.

The slack variable vector S is added to the dispatch problem to ensure technical feasibility, so that a solver for the dispatch problem can find a solution (e.g., decision vectors $x_j$ and slack variable vector S) that satisfies all the constraints in (3.2) and (3.3). In particular, the slack variables help to satisfy the coupling constraints in (3.3). Without the slack variable vector S, the dispatch problem may not have a feasible solution, because the integer variables in the decision vectors $x_j$ are fixed at values provided by the LR dual problem solution or the augmented sub-problem solution, which may not allow for a feasible solution. To discourage the solver from relying on the slack variable vector S to satisfy the coupling constraints in (3.3), elements in the penalty vector M are assigned sufficiently large values (e.g., high costs for the slack variables), since the optimization process is likely to avoid the high cost associated with the slack variables.

Next, in block 305, the feasibility of the solution to the dispatch problem (also referred to as dispatch solution) is checked. The dispatch solution is feasible when the coupling constraints in (3.3) is satisfied with a zero-valued slack variable vector S, which is equivalent to satisfying the coupling constraints (1.3) of the original SCUC system. Therefore, the dispatch solution is considered feasible when the slack variables in the slack variable vector S are zero. A non-zero valued slack variable vector S means that the dispatch solution relies on the slack variables to be technically feasible (e.g., satisfying (3.3)), but does not satisfy the coupling constraints (1.3) of the SCUC system, thus is not feasible. If the dispatch solution is feasible, the processing goes to the block 306, where the SCUC solver 134 generates the resource allocation schedule based on the decision vectors $x_j$ of the feasible dispatch solution, and the processing stops.

If the dispatch solution is infeasible, the method 350 fixes the infeasibility by solving a plurality of augmented sub-problems and solving the dispatch problem with fixed integer decisions from the solution to the augmented sub-problems in one or more iterations, details of which are discussed below. For ease of discussion, checking whether the dispatch solution is infeasible may also be referred to as checking coupling constraints infeasibility of the dispatch solution.

To repair the infeasibility of the dispatch solution, the processing of the method 350 proceeds to the block 307 for the first iteration (e.g., k=0), where a plurality of augmented sub-problems are set up, and coupling constraint bounds for the augmented sub-problems are initialized. The augmented sub-problems are defined as:

$$\min_{x_j, s_j} c_j^T x_j + \lambda^{(k)T} s_j^{(k)} + \rho/2 s_j^{(k)T} s_j^{(k)}, j = 1, 2, \ldots, N. \quad (4.1)$$

subject to $$A_j x_j \geq b_j \quad (4.2)$$

and $$A_{c,j} x_j + s_j^{(k)} \geq y_j^{(k)} \quad (4.3)$$

where k is the iteration index, $\lambda^{(k)}$ is a multiplier vector (e.g., including a plurality of multipliers) in the k-th iteration, $s_j^{(k)}$ is a slack variable vector for the j-th augmented sub-problem in the k-th iteration, $y_j^{(k)}$ is a coupling constraint bond vector (e.g., including a plurality of bounds of coupling constraints) for the j-th augmented sub-problem in the k-th iteration, and ρ is a penalty coefficient for the quadratic term in (4.1). The multiplier vector $\lambda^{(k)}$ may also be referred to as a Lagrangian multiplier vector of the augmented sub-problems, and the plurality of multipliers in the multiplier vector $\lambda^{(k)}$ may also be referred to as Lagrangian multipliers.

The multiplier vector $\lambda^{(k)}$ is initialized to the final value obtained from block 200 in FIG. 2. In subsequent iterations (k>0), the multiplier vector $\lambda^{(k)}$ is updated in each iteration. The penalty coefficient ρ is an input parameter for the augmented sub-problems, thus has a fixed value during the optimization. The coupling constraint bond vector $y_j^{(k)}$ is initialized in the first iteration (when k=0) with the value from the dispatch solution plus allocated infeasibility, if there is any. Details are discussed below.

To initialize the coupling constraints bond vector $y_j^{(k)}$, j=1, 2, . . . , N, each augmented sub-problem is first assigned a temporary coupling constraint bound $\tilde{y}_j^{(0)} = A_{c,j} x_j$, where j=1, 2, . . . , N, and the vector $x_j$ is the decision vectors $x_j$ from the dispatch solution. Next, a vector $b_d$ is calculated by plugging the decision vectors $x_j$ from the dispatch solution into the equation $\Sigma_{j=1}^N A_{c,j} x_j$. The difference between the vector $b_c$ in the coupling constraints (1.3) and the vector $b_d$ is referred to as an infeasibility vector $b_{inf}$ (e.g., $b_{inf} = b_c - b_d$). If the infeasibility vector $b_{inf}$ is not an all-zero vector, the infeasibility vector $b_{inf}$ is partitioned (e.g., split) into N vectors, and each of the N vectors is used to modify a respective temporary coupling constraints bond vector $\tilde{y}_j^{(0)}$ to obtain the coupling constraints bond vector $y_j^{(0)}$, j=1, 2, . . . , N. Different ways to partition and allocate the infeasibility vector $b_{inf}$ are possible. A simple way is to divide the infeasibility vector $b_{inf}$ equally by N, thus allocating the infeasibility vector $b_{inf}$ equally to all the temporary coupling constraint bond vector $\tilde{y}_j^{(o)}$, j=1, 2, . . . , N. In other words, the coupling constraint bond vector $y_j^{(0)}$ may be calculated as $y_j^{(0)} = \tilde{y}_j^{(0)} + b_{inf}/N$, j=1, 2, . . . , N.

Once the augmented sub-problems are set up, and the coupling constraint bond vectors $y_j^{(0)}$ are initialized, a suitable solver, such as an MIP solver, may be used to solve each of the augmented sub-problems, as illustrated in the block 309. A plurality of solvers may be used to solve the augmented sub-problems in parallel to reduce the time needed to find solutions to the augmented sub-problems. In the discussion herein, a solution (e.g., decision vectors $x_j$, j=1, 2, . . . N) to the augmented sub-problems is also referred to as an augmented sub-problem solution.

Next, in block 310, the iteration index k is incremented by one. The processing goes back to the block 303 for the next iteration of processing.

Next, in block 303, the dispatch problem is solved again with fixed integer decisions from the augmented sub-problem solution. Details are the same or similar to those discussed above, thus are not repeated here.

Next, in block 305, the feasibility of the dispatch solution is checked, using the same or similar processing as discussed above. If the dispatch solution is feasible, the processing goes to the block 306, where the SCUC solver 134 generates the resource allocation schedule based on the decision vectors $x_j$ of the feasible dispatch solution, and the processing stops. If the dispatch solution is infeasible, the processing proceeds to blocks 311 and 313, where the multiplier vector $\lambda^{(k)}$ and the coupling constraint bound vector $y_j^{(k)}$ are updated, as discussed below.

Next, in block 311, updates for the multiplier vector $\lambda^{(k)}$ and the coupling constraint bound vector $y_j^{(k)}$ are calculated. In particular, the update $\Delta\lambda^{(k)}(i)$ for the i-th element of the multiplier vector $\lambda^{(k)}$ in the k-th iteration is calculated by:

$$\Delta\lambda^{(k)}(i) = \rho * s_{avg}^{(k)}(i) \qquad (4.4)$$

The update $\Delta\lambda_j^{(k)}(i)$ for the i-th element of the j-th coupling constraint bound vector $y_j^{(k)}$ in the k-th iteration is calculated by:

$$\Delta y_j^{(k)}(i) = s_{avg}^{(k)}(i) - s_j^{(k)}(i) \qquad (4.5)$$

where $s_{avg}^{(k)}(i)$ is an average value (also referred to as an average slack) calculated over the i-th element of slack variable vectors $s_j^{(k)}$, j=1, 2, . . . , N, that have coupling with the i-th coupling constraint. A slack variable vector $s_j^{(k)}$ has coupling with the i-th coupling constraint if any element on the i-th row of the coupling constraint matrix $A_{c,j}$ is non-zero. As an example, if all of the slack variable vectors $s_j^{(k)}$ have coupling with the i-th coupling constraint, the average slack $s_{avg}^{(k)}(i)$ may be calculated by $s_{avg}^{(k)}(i) = 1/N \Sigma_{j=1}^N s_j^{(k)}(i)$. The concurrent adjustment of the multiplier vector $\lambda^{(k)}$ and the coupling constraint bound vector $y_j^{(k)}$ prevents undesirable oscillations in the augmented sub-problem solution, and helps the convergence to a feasible solution, in some embodiments.

Next, in block 313, the multiplier vector $\lambda^{(k)}$ and the coupling constraint bound vector $y_j^{(k)}$ are updated using the updates calculated in block 311. In particular, the multiplier vector $\lambda^{(k)}$ is updated by:

$$\lambda^{(k+1)}(i) = \lambda^{(k)}(i) + \Delta\lambda^{(k)}(i) \qquad (4.6)$$

and the coupling constraint bound vector $y_j^{(k)}$ are updated by:

$$y_j^{(k+1)}(i) = y_j^{(k)}(i) + \Delta y_j^{(k)}(i) \qquad 4.7)$$

Next, in block 309, the augmented sub-problems are solved using the updated multiplier vector $\lambda^{(k)}$ and the updated coupling constraint bound vector $y_j^{(k)}$, using the same or similar processing as discussed above, thus details are not repeated.

Next, in block 310, the iteration index k is incremented by one, and the processing goes back to block 303 for the next iteration of processing.

Next, in block 303, the dispatch problem is solved with fixed integer decisions from the augmented sub-problem solution obtained with the updated multiplier vector $\lambda^{(k)}$ and the updated coupling constraint bound vector $y_j^{(k)}$. The iterative processing continues until a feasible solution is achieved. Note that the processing in block 307 is performed only once at the beginning, when k=0. In subsequent iterations (k>0), the processing of method 350 goes through the path along blocks 311 and 313. By updating the multiplier vector $\lambda^{(k)}$ and the coupling constraint bound vector $y_j^{(k)}$ in each iteration, the processing of method 350 reduces the residual infeasibility of the coupling constraints, and eventually finds a feasible dispatch solution.

Figure 6:
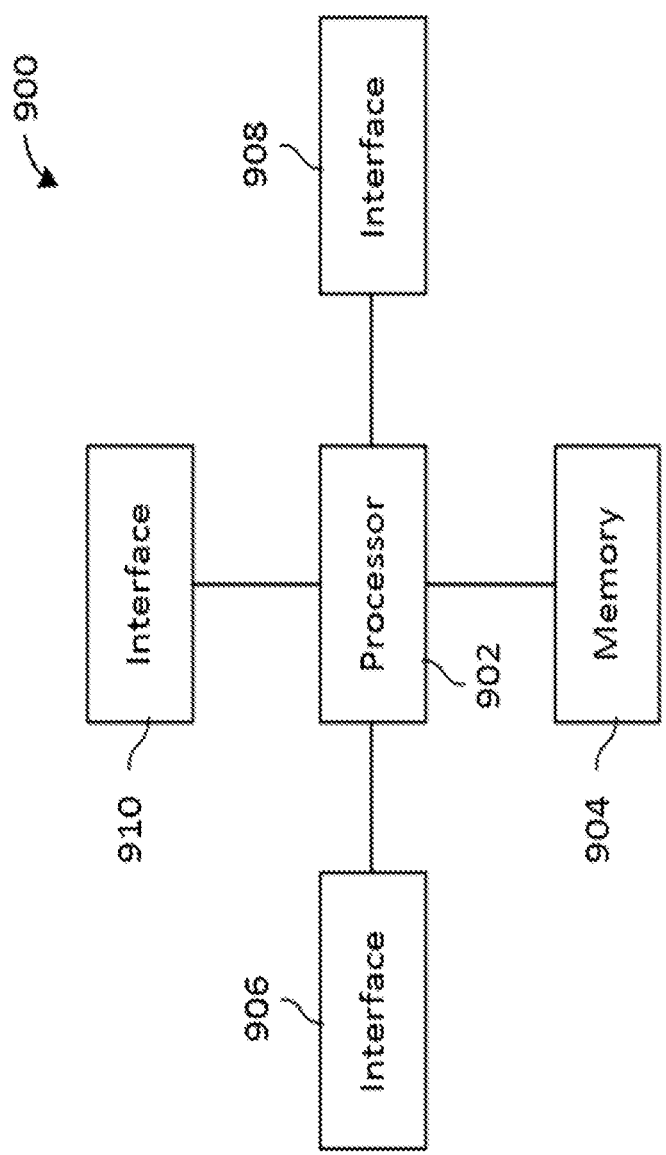
FIG. 6 is a block diagram of a processing system for performing the processing of a power management system, in some embodiments.

FIG. 6 is a block diagram of a processing system 900 for performing the processing of a power management system, in some embodiments. For example, the processing system 900 may be used to implement the PMS 105 of FIG. 1.

As shown in FIG. 6, the processing system 900 includes a processor 902, a memory 904, and interfaces 906-910, which may (or may not) be arranged as shown in FIG. 6. The processor 902 may be any component or collection of components adapted to perform computations and/or other processing related tasks, and the memory 904 may be any component or collection of components adapted to store programming and/or instructions for execution by the processor 902. In an embodiment, the memory 904 includes a non-transitory computer readable medium. The interfaces 906, 908, 910 may be any component or collection of components that allow the processing system 900 to communicate with other devices/components. For example, one or more of the interfaces 906, 908, 910 may be adapted to communicate data, control, or management messages from the processor 902 to applications installed on a host device and/or a remote device. As another example, one or more of the interfaces 906, 908, 910 may be adapted to allow a device (e.g., personal computer (PC), etc.) to interact/communicate with the processing system 900. The processing system 900 may include additional components not depicted in FIG. 6, such as long-term storage (e.g., non-volatile memory, etc.).

Figure 7:
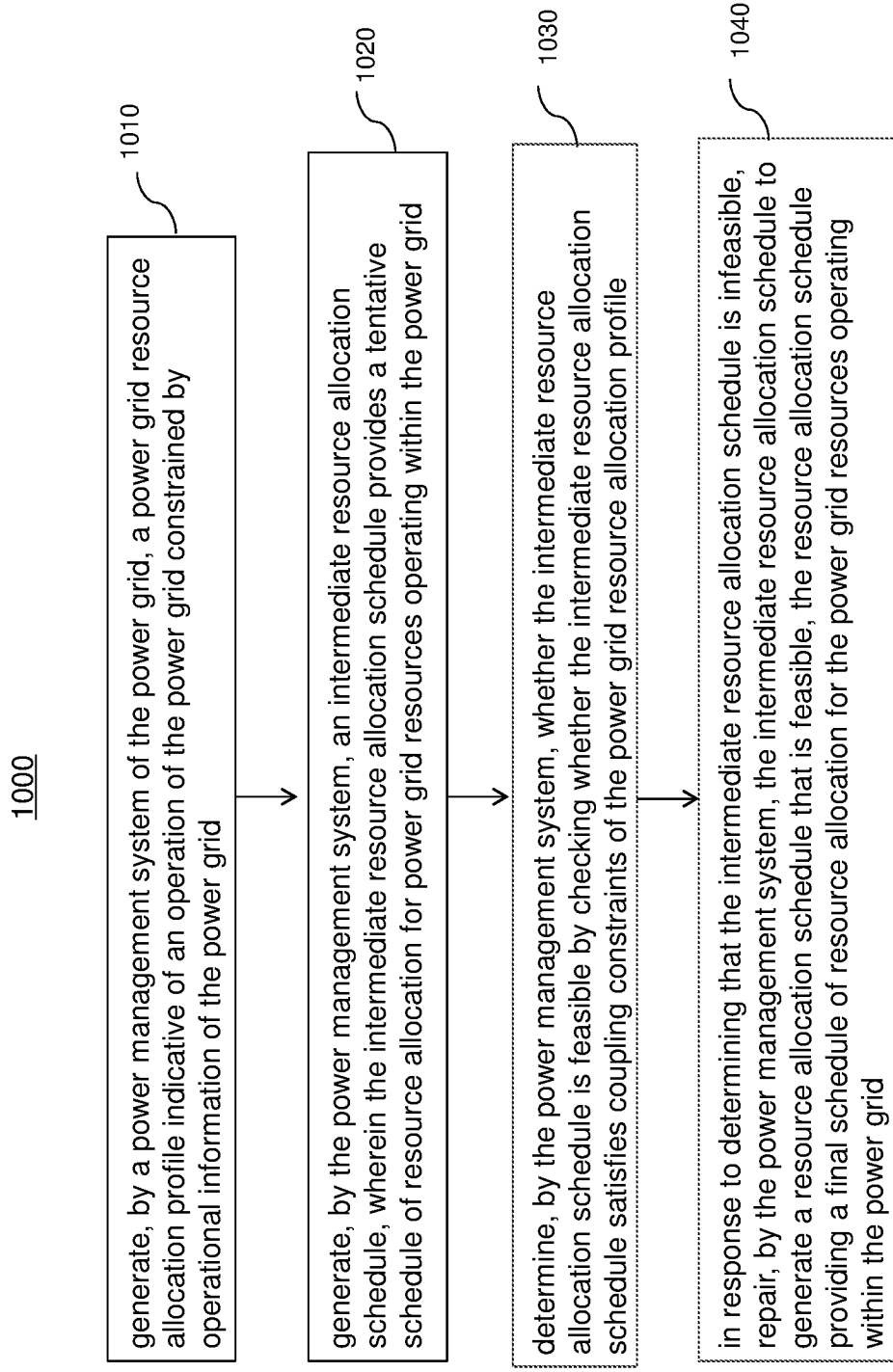
FIG. 7 is a flow chart of a method of operating a power grid, in some embodiments.

FIG. 7 illustrates a flow chart of a method 1000 of operating a power grid, in accordance with some embodiments. It should be understood that the embodiment method shown in FIG. 7 is merely an example of many possible embodiment methods. One of ordinary skill in the art would recognize many variations, alternatives, and modifications. For example, various steps as illustrated in FIG. 7 may be added, removed, replaced, rearranged, or repeated.

Referring to FIG. 7, at block 1010, a power grid resource allocation profile is generated by a power management system of the power grid, the power grid resource allocation profile being indicative of an operation of the power grid constrained by operational information of the power grid. At block 1020, an intermediate resource allocation schedule is generated by the power management system, wherein the intermediate resource allocation schedule provides a tentative schedule of resource allocation for power grid resources operating within the power grid. At block 1030, the power management system determines whether the intermediate resource allocation schedule is feasible by checking whether the intermediate resource allocation schedule satisfies coupling constraints of the power grid resource allocation profile. At block 1040, in response to determining that the intermediate resource allocation schedule is infeasible, the power management system repairs the intermediate resource allocation schedule to generate a resource allocation schedule that is feasible, the resource allocation schedule providing a final schedule of resource allocation for the power grid resources operating within the power grid.

Embodiments may achieve advantages. For example, it may take a long time for a MIP solver to find a feasible solution for an SCUC system, due to, e.g., the larger number of variables to optimize, the types of variable (e.g., integer-valued and real-valued variables) to optimize, and the NP hardness of the SCUC system. The present disclosure provides a computational efficient way to solve the SCUC problem in two steps. In a first step, the SCUC solver solves a Lagrangian-relaxed (LR) dual problem of the SCUC problem. The LR dual problem includes a plurality of LR sub-problems that have lower dimensions (e.g., lower number of variables) and are suitable for parallel processing. The feasibility of the LR dual problem solution is checked. If the LR dual problem solution is feasible, a resource allocation schedule is generated from the decision vectors of the LR dual problem solution. If the LR dual problem solution is infeasible, the infeasibility of the LR dual problem solution is repaired to achieve a feasible solution. The repairing process involves solving a dispatch problem with fixed integer decisions, and solving a plurality of augmented sub-problems with lower dimensions and suitable for parallel processing. The dispatch problem and the augmented sub-problems allow a feasible solution to be found quickly and efficiently.

Variations and modifications to the disclosed embodiments are possible and are fully intended to be included within the scope of the present disclosure. For example, although the disclosed method is described in the frame work of solving SCUC problems, the disclosed method may be readily applied to other MIP problems. As another example, the processing to update the multiplier vector $\lambda^{(k)}$ (e.g., blocks 311 and 313 in FIG. 5) may be performed only for coupling constraints with infeasibility from a dispatch solution. As yet another example, while the feasibility test is done on the dispatch solution in FIG. 5, it is possible to test the feasibility directly on the augmented sub-problem solution.

Example embodiments of the present disclosure are summarized here. Other embodiments can also be understood from the entirety of the specification and the claims filed herein.

Example 1. In an embodiment, a method of operating a power grid includes: generating, by a power management system of the power grid, an optimizer addressing an optimization problem concerning power grid resource allocation, wherein the optimizer includes objectives, constraints and a computing model, wherein there is coupling between at least two of the constraints; generating, by the computing model of the optimizer, a solution to the optimization problem as an intermediate resource allocation schedule, wherein the intermediate resource allocation schedule provides a tentative schedule of resource allocation for power grid resources operating within the power grid; determining, by the computing model of the optimizer, whether the intermediate resource allocation schedule is feasible by checking whether the solution satisfies coupling constraints of the optimizer; and in response to determining that the intermediate resource allocation schedule is infeasible, repairing, by the computing model of the optimizer, the intermediate resource allocation schedule to generate a resource allocation schedule that is feasible, the resource allocation schedule providing a final schedule of resource allocation for the power grid resources operating within the power grid, wherein repairing the intermediate resource allocation schedule comprises determining whether a first dispatch solution obtained by solving a dispatch problem with fixed integer decisions from the intermediate resource allocation schedule is feasible.

Example 2. The method of Example 1, further comprising transmitting, by the power management system, the resource allocation schedule to the power grid resources.

Example 3. The method of Example 1, wherein the constraints of the optimizer comprise information for constraining operation of the power grid and comprise security-related transmission constraint information and cost information.

Example 4. The method of Example 1, wherein generating the optimizer comprises formulating the optimization problem as a Security Constrained Unit Commitment (SCUC) system based on mixed integer programming.

Example 5. The method of Example 1, wherein the intermediate resource allocation schedule is generated by solving a Lagrangian-relaxed (LR) dual of the optimization problem, wherein the LR dual of the optimization problem comprises Lagrangian multipliers and coupling constraints of the optimization problem, wherein the LR dual of the optimization problem comprises a plurality of LR sub-problems, wherein generating the intermediate resource allocation schedule comprises solving the plurality of LR sub-problems in parallel using a plurality of mixed integer programming (MIP) solvers.

Example 6. The method of Example 5, wherein generating the intermediate resource allocation schedule further comprises: calculating a sub-gradient for the Lagrangian multipliers; and updating the Lagrangian multipliers using the calculated sub-gradient.

Example 7. The method of Example 1, wherein determining whether the first dispatch solution is feasible comprises: forming the dispatch problem by modifying the optimization problem with slack variables; solving the dispatch problem with the fixed integer decisions from the intermediate resource allocation schedule to obtain the first dispatch solution; and determining whether there are non-zero slack variables in the first dispatch solution.

Example 8. The method of Example 7, wherein repairing the intermediate resource allocation schedule further comprises generating the resource allocation schedule from commitment decisions of the first dispatch solution in response to determining that there is no non-zero slack variable in the first dispatch solution.

Example 9. The method of Example 8, wherein the first dispatch solution is determined to be infeasible in response to determining that there is a non-zero slack variable in the first dispatch solution.

Example 10. The method of Example 9, wherein repairing the intermediate resource allocation schedule further comprises: in response to determining that the first dispatch solution is infeasible: solving a plurality of augmented sub-problems to generate a first augmented sub-problem solution; generating a second dispatch solution by solving the dispatch problem with fixed integer decisions from the first augmented sub-problem solution; determining whether the second dispatch solution is feasible; and generating the resource allocation schedule from commitment decisions of the second dispatch solution if the second dispatch solution is feasible.

Example 11. The method of Example 10, wherein repairing the intermediate resource allocation schedule further comprises, before solving the plurality of augmented sub-problems: setting up the plurality of augmented sub-problems, wherein the plurality of augmented sub-problems comprise Lagrangian multipliers and coupling constraints bounds for the plurality of augmented sub-problems; and initializing the coupling constraints bounds for the plurality of augmented sub-problems.

Example 12. The method of Example 11, wherein repairing the intermediate resource allocation schedule further comprises: in response to determining that the second dispatch solution is infeasible: updating the Lagrangian multipliers and the coupling constraints bounds of the plurality of augmented sub-problems; solving the plurality of augmented sub-problems with updated Lagrangian multipliers and updated coupling constraints bounds to generate a second augmented sub-problem solution; generating a third dispatch solution by solving the dispatch problem with fixed integer decisions from the second augmented sub-problem solution; determining whether the third dispatch solution is feasible; and generating the resource allocation schedule from commitment decisions of the third dispatch solution if the third dispatch solution is feasible.

Example 13. In an embodiment, a power management system of a power grid includes: one or more processors; and a memory storing a program to be executed in the processor, the program comprising instructions, when executed in the one or more processors, cause the one or more processors to: generate an intermediate resource allocation schedule, wherein the intermediate resource allocation schedule provides a tentative schedule of resource allocation for power grid resources operating within a power grid; determine whether the intermediate resource allocation schedule is feasible by checking whether the intermediate resource allocation schedule satisfies coupling constraints of a power grid resource allocation profile of the power grid, wherein the power grid resource allocation profile is indicative of an operation of the power grid constrained by operational information of the power grid; and in response to determining that the intermediate resource allocation schedule is infeasible, repair the intermediate resource allocation schedule to generate a resource allocation schedule that is feasible, wherein the resource allocation schedule provides a final schedule of resource allocation for the power grid resources operating within the power grid, wherein repairing the intermediate resource allocation schedule comprises determining whether a first dispatch solution obtained by solving a dispatch problem with fixed integer decisions from the intermediate resource allocation schedule is feasible.

Example 14. The power management system of Example 13, further comprising: a transmitter configured to transmit the resource allocation schedule to the power grid resources, wherein the power grid resources are configured to be controlled in accordance with the resource allocation schedule.

Example 15. The power management system of Example 13, wherein the intermediate resource allocation schedule is generated by solving a Lagrangian-relaxed (LR) dual of the power grid resource allocation profile, wherein the LR dual of the power grid resource allocation profile comprises a plurality of LR sub-problems, wherein the program comprises instructions that cause the one or more processors to generate the intermediate resource allocation schedule by solving the plurality of LR sub-problems in parallel using a plurality of solvers.

Example 16. The power management system of Example 13, wherein determining whether the first dispatch solution is feasible comprises: forming the dispatch problem by modifying the power grid resource allocation profile with slack variables; solving the dispatch problem with the fixed integer solutions from the intermediate resource allocation schedule to obtain the first dispatch solution; and determining whether there are non-zero slack variables in the first dispatch solution; and wherein repairing the intermediate resource allocation profile further comprises generating the resource allocation schedule from commitment decisions of the first dispatch solution in response to determining that there is no non-zero slack variable in the first dispatch solution.

Example 17. The power management system of Example 16, wherein the program comprises further instructions to repair the intermediate resource allocation schedule by causing the one or more processors to: in response to determining that the first dispatch solution is infeasible: solve a plurality of augmented sub-problems to generate a first augmented sub-problem solution, wherein the plurality of augmented sub-problems comprise Lagrangian multipliers and coupling constraints bounds for the plurality of augmented sub-problems; generate a second dispatch solution by solving the dispatch problem with fixed integer decisions from the first augmented sub-problem solution; determine whether the second dispatch solution is feasible; and generate the resource allocation schedule from commitment decisions of the second dispatch solution in response to determining that the second dispatch solution is feasible.

Example 18. The power management system of Example 17, wherein the program comprises instructions to repair the intermediate resource allocation schedule by causing the one or more processors to: in response to determining that the second dispatch solution is infeasible: update the Lagrangian multipliers and the coupling constraints bounds of the plurality of augmented sub-problems; solve the plurality of augmented sub-problems with updated Lagrangian multipliers and updated coupling constraints bounds to generate a second augmented sub-problem solution; and generate a third dispatch solution by solving the dispatch problem with fixed integer decisions from the second augmented sub-problem solution.

Example 9. In an embodiment, a system of a power grid includes: a power management system configured to: generate an intermediate resource allocation schedule, wherein the intermediate resource allocation schedule provides a tentative schedule of resource allocation for power grid resources operating within a power grid; determine whether the intermediate resource allocation schedule is feasible by checking whether the intermediate resource allocation schedule satisfies coupling constraints of a power grid resource allocation profile of the power grid, wherein the power grid resource allocation profile is indicative of an operation of the power grid constrained by operational information of the power grid; and in response to determining that the intermediate resource allocation schedule is infeasible, generate a resource allocation schedule that is feasible by repairing the intermediate resource allocation schedule, wherein the resource allocation schedule provides a final schedule of resource allocation for the power grid resources operating within the power grid, wherein repairing the intermediate resource allocation schedule comprises determining whether a first dispatch solution obtained by solving a dispatch problem with fixed integer decisions from the intermediate resource allocation schedule is feasible; power grid resources configured to be controlled in accordance with the resource allocation schedule; and a transmitter configured to transmit the resource allocation schedule from the power management system to the power grid resources.

Example 20. The system of Example 19, wherein determining whether the first dispatch solution is feasible comprises: forming the dispatch problem by modifying the power grid resource allocation profile with slack variables; solving the dispatch problem with the fixed integer decisions from the intermediate resource allocation schedule to obtain the first dispatch solution; and determining whether there are non-zero slack variables in the first dispatch solution; and wherein repairing the intermediate resource allocation schedule further comprises generating the resource allocation schedule from commitment decisions of the first dispatch solution in response to determining that there is no non-zero slack variable in the first dispatch solution.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method of operating a power grid comprising:

generating, by a power management system of the power grid, an intermediate resource allocation schedule, wherein the intermediate resource allocation schedule provides a tentative schedule of resource allocation for power grid resources operating within the power grid;

determining, by the power management system, whether the intermediate resource allocation schedule is feasible by checking whether the intermediate resource allocation schedule satisfies coupling constraints of a power grid resource allocation profile of the power grid, wherein the power grid resource allocation profile is indicative of an operation of the power grid constrained by operational information of the power grid;

in response to determining that the intermediate resource allocation schedule is infeasible, repairing, by the power management system, the intermediate resource allocation schedule to generate a resource allocation schedule that is feasible, the resource allocation schedule providing a final schedule of resource allocation for the power grid resources operating within the power grid, wherein repairing the intermediate resource allocation schedule comprises determining whether a first dispatch solution obtained by solving a dispatch problem with fixed integer decisions from the intermediate resource allocation schedule is feasible, wherein determining whether the first dispatch solution is feasible comprises:

forming the dispatch problem by adding slack variables to the coupling constraints of the power grid resource allocation profile and to an objective function of the power grid resource allocation profile;

solving the dispatch problem with the fixed integer decisions from the intermediate resource allocation schedule to obtain the first dispatch solution; and determining whether there are non-zero slack variables in the first dispatch solution; and transmitting, by the power management system, the resource allocation schedule to the power grid resources.

2. The method of claim 1, wherein the operational information comprises information for constraining operation of the power grid and comprises security-related transmission constraint information and cost information.

3. The method of claim 1, wherein generating the power grid resource allocation profile comprises formulating the power grid resource allocation profile as a Security Constrained Unit Commitment (SCUC) system based on mixed integer programming.

4. The method of claim 1, wherein the intermediate resource allocation schedule is generated by solving a Lagrangian-relaxed (LR) dual of the power grid resource allocation profile, wherein the LR dual of the power grid resource allocation profile comprises Lagrangian multipliers and coupling constraints of the power grid resource allocation profile, wherein the LR dual of the power grid resource allocation profile comprises a plurality of LR sub-problems, wherein generating the intermediate resource allocation schedule comprises solving the plurality of LR sub-problems in parallel using a plurality of mixed integer programming (MIP) solvers.

5. The method of claim 4, wherein generating the intermediate resource allocation schedule further comprises:
calculating a sub-gradient for the Lagrangian multipliers; and
updating the Lagrangian multipliers using the calculated sub-gradient.

6. The method of claim 1, wherein repairing the intermediate resource allocation schedule further comprises generating the resource allocation schedule from commitment decisions of the first dispatch solution in response to determining that there is no non-zero slack variable in the first dispatch solution.

7. The method of claim 6, wherein the first dispatch solution is determined to be infeasible in response to determining that there is a non-zero slack variable in the first dispatch solution.

8. The method of claim 7, wherein repairing the intermediate resource allocation schedule further comprises:
in response to determining that the first dispatch solution is infeasible:
solving a plurality of augmented sub-problems to generate a first augmented sub-problem solution;
generating a second dispatch solution by solving the dispatch problem with fixed integer decisions from the first augmented sub-problem solution;
determining whether the second dispatch solution is feasible; and
generating the resource allocation schedule from commitment decisions of the second dispatch solution if the second dispatch solution is feasible.

9. The method of claim 8, wherein repairing the intermediate resource allocation schedule further comprises, before solving the plurality of augmented sub-problems:
setting up the plurality of augmented sub-problems, wherein the plurality of augmented sub-problems comprise Lagrangian multipliers and coupling constraints bounds for the plurality of augmented sub-problems; and
initializing the coupling constraints bounds for the plurality of augmented sub-problems.

10. The method of claim 9, wherein repairing the intermediate resource allocation schedule further comprises:
in response to determining that the second dispatch solution is infeasible:
updating the Lagrangian multipliers and the coupling constraints bounds of the plurality of augmented sub-problems;
solving the plurality of augmented sub-problems with updated Lagrangian multipliers and updated coupling constraints bounds to generate a second augmented sub-problem solution;
generating a third dispatch solution by solving the dispatch problem with fixed integer decisions from the second augmented sub-problem solution;
determining whether the third dispatch solution is feasible; and
generating the resource allocation schedule from commitment decisions of the third dispatch solution if the third dispatch solution is feasible.

11. A power management system of a power grid comprising:
one or more processors;
a memory storing a program to be executed in the processor, the program comprising instructions, when executed in the one or more processors, cause the one or more processors to:
generate an intermediate resource allocation schedule, wherein the intermediate resource allocation schedule provides a tentative schedule of resource allocation for power grid resources operating within a power grid;
determine whether the intermediate resource allocation schedule is feasible by checking whether the intermediate resource allocation schedule satisfies coupling constraints of a power grid resource allocation profile of the power grid, wherein the power grid resource allocation profile is indicative of an operation of the power grid constrained by operational information of the power grid; and
in response to determining that the intermediate resource allocation schedule is infeasible, repair the intermediate resource allocation schedule to generate a resource allocation schedule that is feasible, wherein the resource allocation schedule provides a final schedule of resource allocation for the power grid resources operating within the power grid, wherein repairing the intermediate resource allocation schedule comprises determining whether a first dispatch solution obtained by solving a dispatch problem with fixed integer decisions from the intermediate resource allocation schedule is feasible, wherein determining whether the first dispatch solution is feasible comprises:
forming the dispatch problem by modifying the power grid resource allocation profile with slack variables;
solving the dispatch problem with the fixed integer solutions from the intermediate resource allocation schedule to obtain the first dispatch solution; and
determining whether there are non-zero slack variables in the first dispatch solution; and
a transmitter configured to transmit the resource allocation schedule to the power grid resources.

12. The power management system of claim 11, wherein the power grid resources are configured to be controlled in accordance with the resource allocation schedule.

13. The power management system of claim 11, wherein the intermediate resource allocation schedule is generated by solving a Lagrangian-relaxed (LR) dual of the power grid resource allocation profile, wherein the LR dual of the power grid resource allocation profile comprises a plurality of LR sub-problems, wherein the program comprises instructions that cause the one or more processors to generate the intermediate resource allocation schedule by solving the plurality of LR sub-problems in parallel using a plurality of solvers.

14. The power management system of claim 11,
wherein repairing the intermediate resource allocation schedule further comprises generating the resource allocation schedule from commitment decisions of the first dispatch solution in response to determining that there is no non-zero slack variable in the first dispatch solution.

15. The power management system of claim 14, wherein the program comprises further instructions to repair the intermediate resource allocation schedule by causing the one or more processors to:
in response to determining that the first dispatch solution is infeasible:
solve a plurality of augmented sub-problems to generate a first augmented sub-problem solution, wherein the plurality of augmented sub-problems comprise Lagrangian multipliers and coupling constraints bounds for the plurality of augmented sub-problems;

generate a second dispatch solution by solving the dispatch problem with fixed integer decisions from the first augmented sub-problem solution;

determine whether the second dispatch solution is feasible; and generate the resource allocation schedule from commitment decisions of the second dispatch solution in response to determining that the second dispatch solution is feasible.

16. The power management system of claim 15, wherein the program comprises instructions to repair the intermediate resource allocation schedule by causing the one or more processors to:

in response to determining that the second dispatch solution is infeasible:

update the Lagrangian multipliers and the coupling constraints bounds of the plurality of augmented sub-problems;

solve the plurality of augmented sub-problems with updated Lagrangian multipliers and updated coupling constraints bounds to generate a second augmented sub-problem solution; and generate a third dispatch solution by solving the dispatch problem with fixed integer decisions from the second augmented sub-problem solution.

17. A system of a power grid comprising:

a power management system configured to:

generate an intermediate resource allocation schedule, wherein the intermediate resource allocation schedule provides a tentative schedule of resource allocation for power grid resources operating within a power grid;

determine whether the intermediate resource allocation schedule is feasible by checking whether the intermediate resource allocation schedule satisfies coupling constraints of a power grid resource allocation profile of the power grid, wherein the power grid resource allocation profile is indicative of an operation of the power grid constrained by operational information of the power grid; and in response to determining that the intermediate resource allocation schedule is infeasible, generate a resource allocation schedule that is feasible by repairing the intermediate resource allocation schedule, wherein the resource allocation schedule provides a final schedule of resource allocation for the power grid resources operating within the power grid, wherein repairing the intermediate resource allocation schedule comprises determining whether a first dispatch solution obtained by solving a dispatch problem with fixed integer decisions from the intermediate resource allocation schedule is feasible, wherein determining whether the first dispatch solution is feasible comprises:

forming the dispatch problem by modifying the power grid resource allocation profile with slack variables;

solving the dispatch problem with the fixed integer decisions from the intermediate resource allocation schedule to obtain the first dispatch solution; and determining whether there are non-zero slack variables in the first dispatch solution;

power grid resources configured to be controlled in accordance with the resource allocation schedule; and a transmitter configured to transmit the resource allocation schedule from the power management system to the power grid resources.

18. The system of claim 17, wherein repairing the intermediate resource allocation schedule further comprises generating the resource allocation schedule from commitment decisions of the first dispatch solution in response to determining that there is no non-zero slack variable in the first dispatch solution.

* * * * *